No. 683,561. Patented Oct. 1, 1901.
W. H. HOLMES.
TWINE TENSION DEVICE FOR HARVESTING MACHINES.
(Application filed July 29, 1901.)
(No Model.)
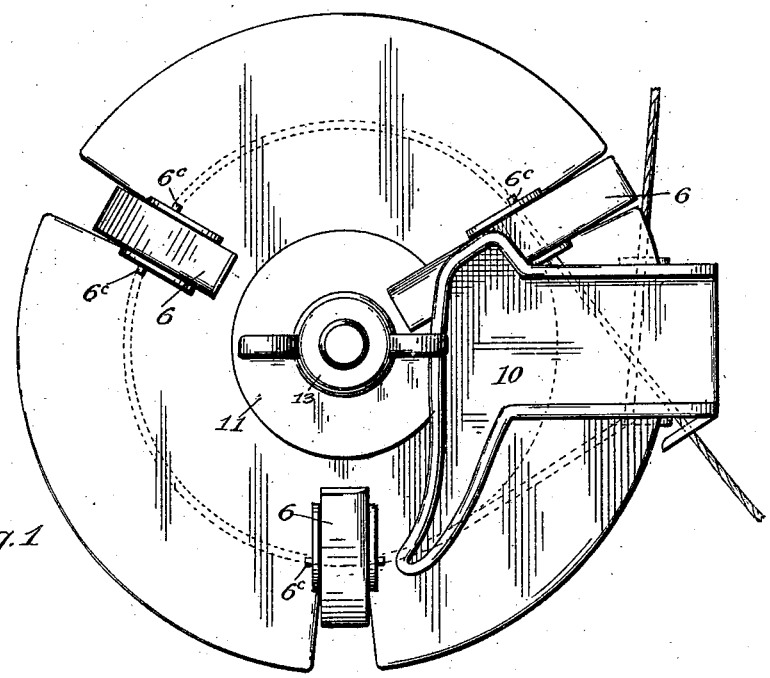
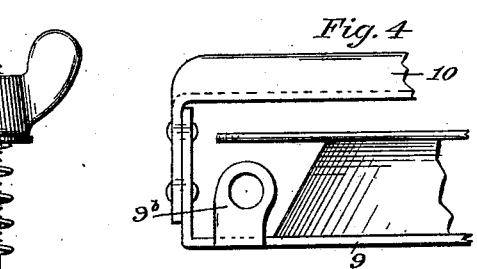
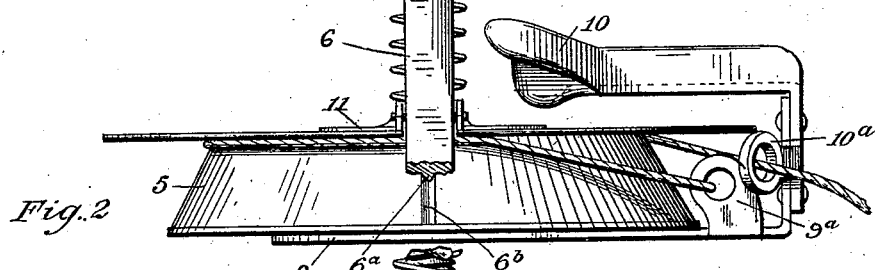
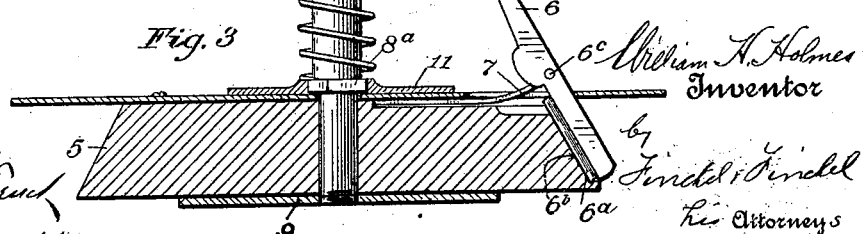
Witnesses
Thos. E. French
Silas Martin
William H. Holmes
Inventor
by Finckel & Finckel
his Attorneys

UNITED STATES PATENT OFFICE.

WILLIAM H. HOLMES, OF COLUMBUS, OHIO.

TWINE TENSION DEVICE FOR HARVESTING-MACHINES.

SPECIFICATION forming part of Letters Patent No. 683,561, dated October 1, 1901.

Application filed July 29, 1901. Serial No. 70,177. (No model.)

*To all whom it may concern:*

Be it known that I, WILLIAM H. HOLMES, a citizen of the United States, residing at Columbus, in the county of Franklin and State of Ohio, have invented certain new and useful Improvements in Twine Tension Devices for Harvesting-Machines; and I do hereby declare the following to be a full, clear, and exact description of the invention, such as will enable others skilled in the art to which it appertains to make and use the same.

The object of this invention is to provide a twine tension device for harvesting-machines that shall be reliable in its action, easily and quickly manipulated to regulate the tension on the twine, and in which knots or lack of uniformity in the twine shall not interfere with its proper action.

Heretofore the tension device commonly used consisted of a stationary spring clamp-like device, the twine being pulled between the parts of the device. In such a device the tension on the twine was irregular and knots or other inequalities in the twine caused serious interference with the operation of the binder.

In my present device I aim to secure uniform tension and certainty of operation whatever be the faults of the twine.

In the accompanying drawings, illustrating one embodiment of my invention, Figure 1 is a plan view. Fig. 2 is a side view, one dog being in section. Fig. 3 is a central vertical sectional view, and Fig. 4 is a detail to show the twine-exit eye opposite that shown at the right hand of Fig. 2.

In the several views, 5 designates a disk or wheel, the periphery of which is shown to be in the form of a V-shaped groove. This disk has hinged to it at $6^c$ a number of equidistantly-located lever-like dogs 6, the lower arms of which are shown to be made with longitudinal ribs $6^a$ to fit in corresponding recesses $6^b$ in the periphery of the wheel or disk, while the upper arms project upwardly beyond the upper side of the disk. Each of the dogs is furnished with a spring 7, tending to hold the lower arm of the dog down toward the periphery of the disk. The rib $6^a$ can be omitted. The disk or wheel turns upon a stationary pin 8, fastened in a plate 9, which latter is to be secured at the proper place upon the machine on which the tension device is to be used. The plate 9 is shown to have formed with it on one side an eye $9^a$ and at the opposite side with an eye $9^b$. (See Fig. 4.) Secured to an upwardly-turned end of the plate 9 is the shank of a cam 10. This cam is located in the path of movement of the upper arms of the dogs 6, so that as said arms successively impinge against the cam they are forced down and the lower arm or part of the dog lifted. The shank of the cam 10 can be conveniently made with the eye $10^a$, that guides the twine from its original receptacle onto the disk or wheel. 11 designates a friction-piece that lies against the upper side of the disk. This friction-piece has a square orifice that fits on a square portion $8^a$ of the stationary pin to prevent it from rotating with the disk. The pressure of the friction-piece on the disk or wheel is regulated by a coil-spring 12 encircling the upper portion of the pin 8, which latter can be threaded to receive an adjustable nut 13. By turning the nut up or down on the pin 8 the pressure of the spring on the friction-disk can be varied to obtain just the proper tension on the twine.

In practice the twine is passed from its original holder or receptacle through the eye $10^a$. At this point and a little beyond the lower end the dog 6 is lifted by the cam 10, and therefore permits the twine to lie against the periphery of the wheel and under the dog after it passes the cam. The twine is then passed entirely around the periphery of the disk and under the dogs, the ribs on the dogs aiding in holding the twine from any movement independent of the movement of the disk itself, and finally through the eyes $9^a$ and $9^b$ to the needle or other place of use.

The parts herein shown and described can obviously be changed and some details entirely omitted without departing from the essence of the invention.

The device can of course be used in any place where tension on a twine or cord is desirable, although the device as herein shown is especially designed for use in connection with harvesting-machines.

What I claim, and desire to secure by Letters Patent, is—

1. In a tension device, a rotatable disk, a dog to hold a twine to said disk, and a cam to automatically lift said dog to permit the twine to pass onto said disk, substantially as described.

2. In a tension device, a rotatable disk, a dog to hold a twine to said disk, a cam to automatically lift said dog to permit a twine to pass onto said disk, and a friction device arranged to retard the movement of the disk, substantially as described.

3. In a tension device, a rotatable disk, a dog to hold a twine to said disk, a cam to automatically lift said dog to permit a twine to pass onto said disk and under said dog, combined with a stationary friction device to retard said disk, and means for regulating the pressure of the same, substantially as described.

4. In a tension device, a rotatable disk, a dog to hold a twine to said disk, a cam to automatically lift said dog to permit the twine to pass onto said disk under said dog, and a guide to direct the twine under the dog, substantially as described.

5. In a tension device, a rotatable disk, a dog to hold a twine to said disk, a cam to automatically lift said dog to permit the twine to pass onto said disk under said dog and guides to direct the twine under the dog and off the disk, substantially as described.

6. In a tension device, a rotatable disk, dogs on the disk to hold a twine to said disk, a stationary cam to automatically and successively lift said dogs to permit the twine to feed onto said disk, a stationary pin on which said disk rotates, a friction-piece placed non-rotatably on said pin and bearing on said disk, a spring bearing on the friction-piece, and means for regulating the pressure of the spring on said friction-piece, substantially as described.

In testimony whereof I affix my signature in presence of two witnesses.

WILLIAM H. HOLMES.

Witnesses:
N. E. GIVENS,
J. I. COLE.